United States Patent [19]

Devarakonda et al.

[11] Patent Number: 5,659,682

[45] Date of Patent: Aug. 19, 1997

[54] SCHEME TO DETERMINE COMPLETION OF DIRECTORY OPERATIONS FOR SERVER RECOVERY

[75] Inventors: Murthy V. Devarakonda, Ossining; William A. Kish, Millerton, both of N.Y.

[73] Assignee: International Business Machines Corporation, Armonk, N.Y.

[21] Appl. No.: 260,864

[22] Filed: Jun. 16, 1994

[51] Int. Cl.$^6$ ................................................. G06F 11/34
[52] U.S. Cl. .................... 395/184.01; 395/608; 395/726
[58] Field of Search ................................. 395/575, 425, 395/600, 184.01, 185.04, 650; 371/9.1, 8, 2, 12, 20.1, 16.5, 29.1

[56] References Cited

U.S. PATENT DOCUMENTS

| | | |
|---|---|---|
| 4,645,474 | 2/1987 | Olschewski et al. . |
| 5,012,405 | 4/1991 | Nishikado et al. . |
| 5,032,979 | 7/1991 | Hecht et al. . |
| 5,095,421 | 3/1992 | Freund . |
| 5,129,080 | 7/1992 | Smith . |
| 5,140,689 | 8/1992 | Kobayashi . |
| 5,151,989 | 9/1992 | Johnson et al. . |
| 5,157,663 | 10/1992 | Major et al. . |
| 5,161,227 | 11/1992 | Dias et al. ................................. 395/650 |
| 5,201,044 | 4/1993 | Frey, Jr. et al. . |
| 5,218,695 | 6/1993 | Noveck et al. . |
| 5,247,664 | 9/1993 | Thompson et al. . |
| 5,280,611 | 1/1994 | Mohan et al. . |
| 5,303,244 | 4/1994 | Watson . |

*Primary Examiner*—Robert W. Beausoliel, Jr.
*Assistant Examiner*—Phung My Chung
*Attorney, Agent, or Firm*—Richard M. Ludwin

[57] ABSTRACT

In a fault-tolerant distributed file system, the server state needs to be reconstructed after the server restarts or when its function is taken over by another node. A crucial part of the server state is determining whether or not in-flight, directory-operations initiated by the clients have been completed. Described is a check-before-request scheme that solves this problem. A global lock is obtained on the directory or directories first. A check is made on the directories to see if the operation would succeed, and if so a request is made to the server for the operation. If the server were to fail during the execution of the operation, completion of the operation prior to failure can be determined by merely re-examining the directory contents.

18 Claims, 4 Drawing Sheets

FIG. 4A

| | |
|---|---|
| 401 | ID OF CLIENT NODE |
| 402 | MSG TYPE = CHECK |
| 403 | ID OF USER INITIATING OPERATION |
| 404 | FILEHANDLE OF DIRECTORY |
| 405 | NAME OF FILE BEING CHECKED |

FIG. 4B

| | |
|---|---|
| 406 | ID OF SERVER NODE |
| 402 | MSG TYPE = CHECK REPLY |
| 408 | RESPONSE CODE |

FIG. 4C

| | |
|---|---|
| 401 | ID OF CLIENT NODE |
| 402 | MSG TYPE = CREATE |
| 403 | ID OF USER INITIATING OPERATION |
| 404 | FILEHANDLE OF DIRECTORY |
| 413 | NAME OF FILE BEING CREATED |

FIG. 4D

| | |
|---|---|
| 414 | ID OF SERVER NODE |
| 402 | MSG TYPE = CHECK REPLY |
| 408 | RESPONSE CODE |
| 417 | FILEHANDLE OF NEWLY CREATED FILE |
| 418 | ATTRIBUTES OF NEWLY CREATED FILE |

SCHEME TO DETERMINE COMPLETION OF DIRECTORY OPERATIONS FOR SERVER RECOVERY

BACKGROUND OF THE INVENTION a. Field of the Invention

This invention relates to distributed file systems for use in a network of computer systems having access to shared files.

b. Related Art

In a distributed computer network, multiple data processing nodes, each under control of its own operating system, are joined by a communications network and share files stored on disks. Access to the shared files is provided by distributed file system software, which is implemented in each of the respective systems.

Some of the component functions of a distributed file system that include locking, remote file access, and recovery from failure of a data processing node.

Locking is one method of synchronizing accesses to shared files to ensure that conflicts do not occur between tasks. By this method, a requesting task first obtains access to a data structure known as a lock and then indicates the type of access that is desired in order to either read or modify data in the file, database or other data object that is protected by the lock. Other tasks are then prevented from accessing or given only limited access (e.g. read only) to the protected data until the requesting task changes the indication of the type of access desired and releases the lock so that other tasks can access it.

Commonly, a global lock manager is provided to resolve lock requests among tasks running on different processors and to maintain queues of tasks awaiting access to particular lock entities. Computer Networks having a global lock manager are described, for example, in U.S. Pat. No. 5,161,227 to Dias et al. and U.S. Pat. No. 5,226,143 to Baird et al.

Remote file access is a software mechanism for a data processing node on a network to fetch data stored on disks attached to another data processing node on the network. The node with disk attached is called a server, and the node using the data is called a client. Remote file access can also be used for writing data on disks of a data processing node. Parts of the software that enables this function run on both the client and the server. When a client node needs to look up the contents of a directory, for example, it sends a directory request message to the server, and the server responds with the directory contents. Similarly, when a client wants to create a file in the directory, the client sends a request to that effect, the server carries out the task, and responds with an acknowledgement.

Recovery from a failure of a data processing node is a critical function in a computer network, especially when nodes are related to each other as clients and servers as described above. Data processing nodes may fail or crash because of hardware errors or more increasingly because of software errors. In order to restore access to the disks connected to the failed node either the failed node is restarted or another node is set up in such as way that it can take over the control of the disk and continue to provide access to the disk. The latter method requires independent power source and multiple access ports for the disk. However, restarting the node or take over the disk control by a second node is only part of the failure recovery. The software state of the server should also be reconstructed for proper and uninterrupted functioning of the distributed file system.

For example, the server fails while handling the request for creation of a file in a directory, the system should determine whether the create operation has actually succeeded. The presence of the name in the directory is not enough information to decide this as the file may have existed prior to the creation attempt. In that event, if the server were had not failed the remote create operation would have returned a notification indicating the preexistence of the file.

SUMMARY OF THE INVENTION

According to an embodiment of the present invention a distributed file system includes a system and a method for determining completion of directory operations where the server has failed while processing the operations. In accordance with the method, a client obtains a global lock on the directory, determines if the directory operation can succeed, and if so makes the request to the server. If the server fails while processing the request, an examination of the directory contents is used to determine whether the requested operation was carried out before the server failure.

DETAILED DESCRIPTION OF THE PREFERRED EMBODIMENT

Figure 1:
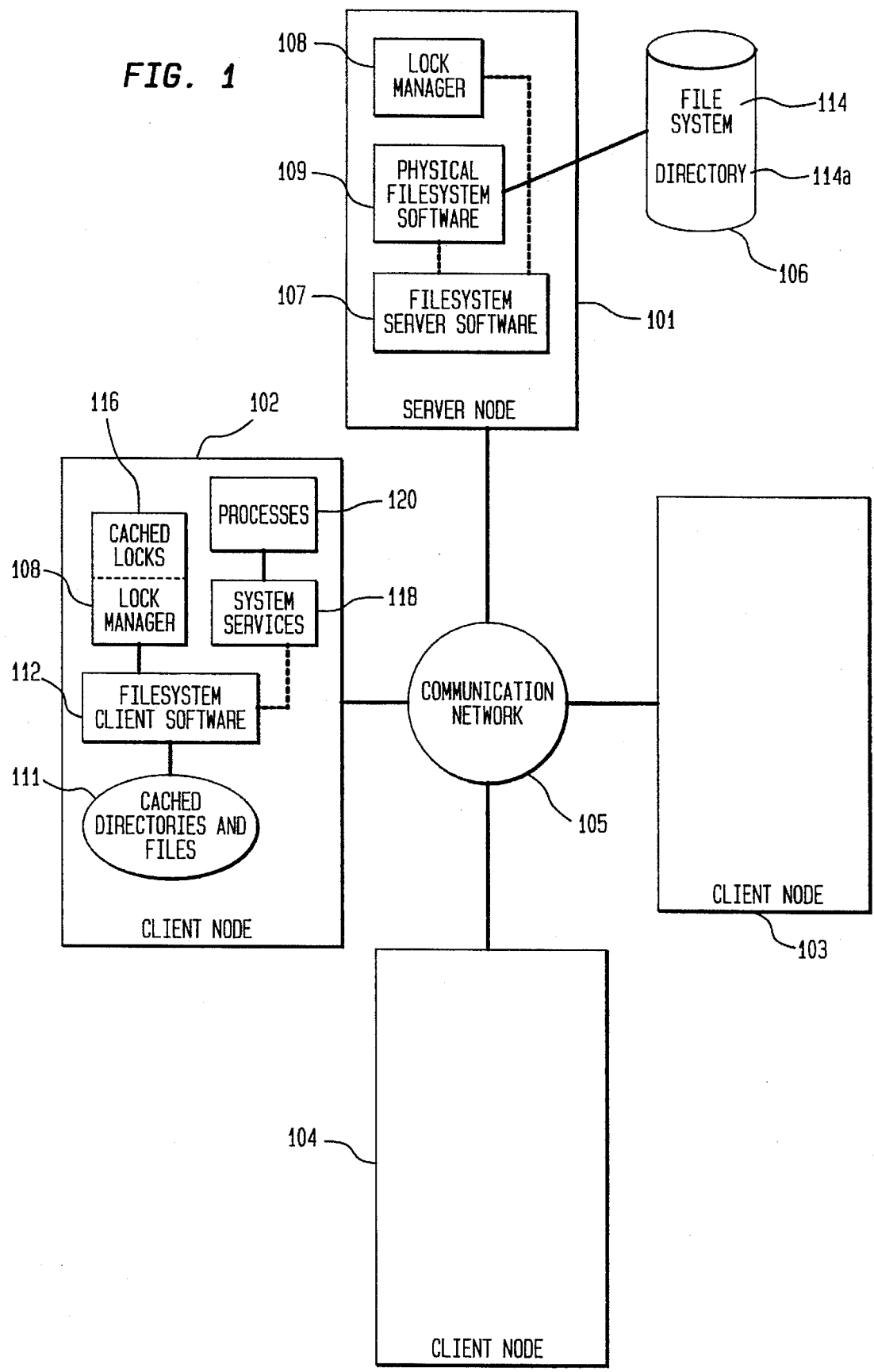
FIG. 1 depicts a computer network suitable for use with the present invention.

A loosely coupled system suitable for use with the present invention is illustrated in FIG. 1. The system includes a number of processing nodes (sometimes referred to as nodes) 101–104 interconnected by way of a communication network 105. One of the nodes 101 acts as a file server for a file system 114, instantiated on a disk 106. The other nodes 102–104 are clients with respect to the file system 114. The file system 114 is of a conventional type which includes a directory 114a which includes information such as the name, size and modification time and date for each of the files which form the file system. Each of the nodes can be running one or more processes which can request access to shared files in the file system 114. Those of skill in the art will recognize that the system of FIG. 1 can include additional file systems and that each of the nodes can have an attached disk and act as a server with respect to a file system instantiated thereon.

Each of the nodes includes a lock manager 108 and a lock state table 116 which maintains a local memory copy of the tokens (lock identifiers) which have been most recently used by the node. Each of the client nodes also maintains a cached copy 111 of the directories and files which it has most recently accessed. The server node 101 includes a file system server task 107 which processes file system requests, such as file creation and data read requests, from clients; and a physical file system 109 which translates requests from the server task into access commands for the disk 106. The client nodes also includes filesystem client software 112 which processes local requests from a set of system services 118. The system services 118 provide an interface between user programs and the operating system (not shown). These tasks 107, 112 and services 118 can be a conventional type such as is found in the UNIX or AIX operating systems which can be modified in accordance with the principles of the present invention.

The nodes 101–104 can be embodied, for example, on IBM RISC System/6000 machines using AIX 3.2. The communications protocol can be, for example, be either UDP/IP or TCP/IP. The network 105 can be of any conventional type, for example a token ring.

Processes 120 (such as applications) running on a client node invoke the system services 118 to read from and write to the files of the shared file system 114. One type of system services requested by processes are related to directories rather than files. These services, referred to as "directory operations" include reading the contents of a directory, erasing a file from a directory, creating a file or a directory, and renaming a file.

Figure 2:
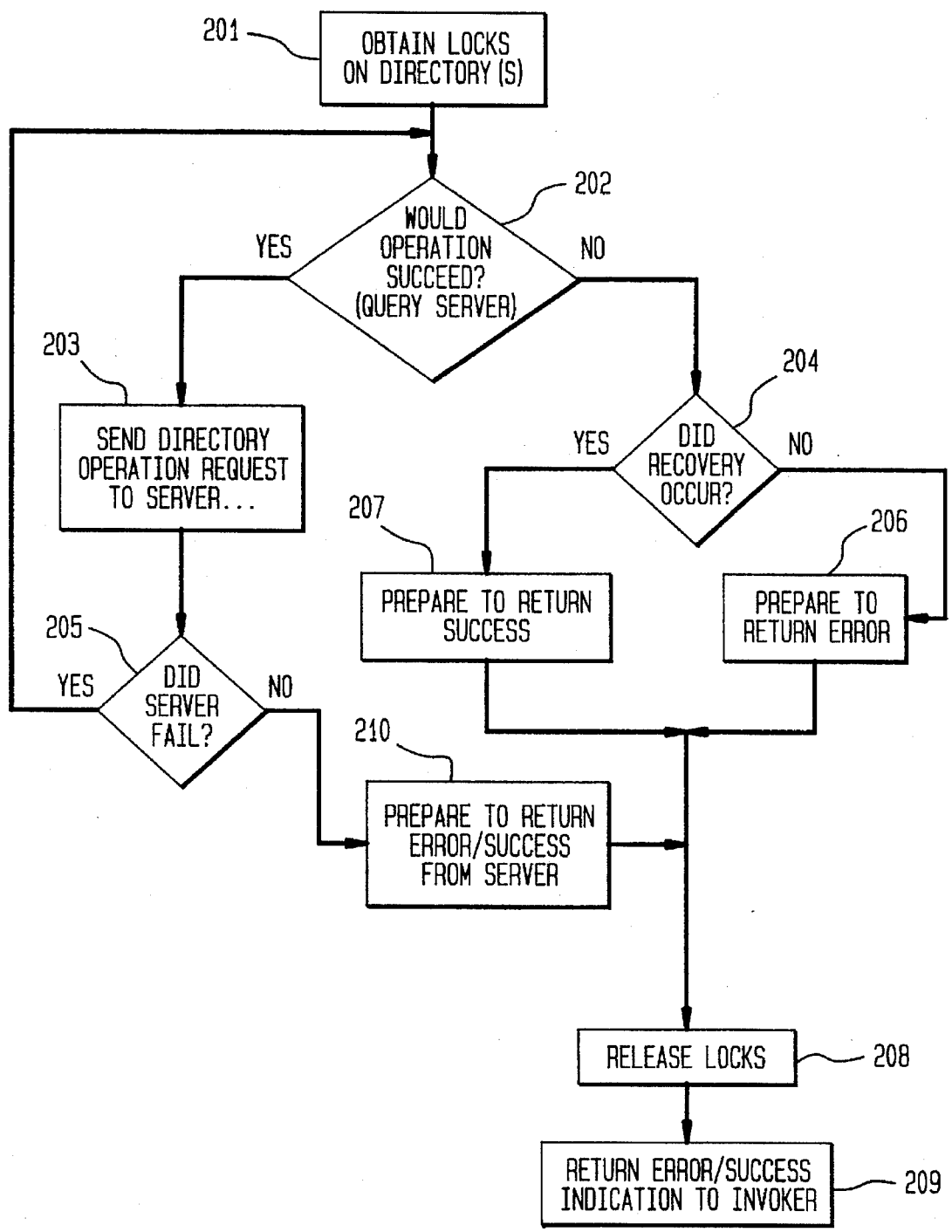
FIG. 2 is a flow chart of the distributed file system client task in the present system.

A flow chart of the operation of a client task is shown in FIG. 2. When an application invokes a directory operation, in step 201 the client part of the distributed file system obtains a write (exclusive) or read (shared) lock on the directory using the lock managers 108.

The operation of the lock managers 108 is such that if the lock cannot be granted in a requested mode (e.g READ or WRITE), the application is made to wait until the lock becomes available and when it becomes available the lock is granted. If the directory operation requires moving a file from one directory to another, it is necessary to obtain locks on two directories.

Once the lock or locks are obtained, in step 202 the client 102 examines the directory contents to determine if the operation would succeed if it is carried out on the server.

After examining the directory contents, in step 203 the client sends a message to the server specifying the requested directory operation, the name (internal representation) of the directory being operated upon, the name of the file to be operated on and any other relevant information depending upon the operation. In the normal course of operation (if the server did not fail), as a response to this message, the server carries out the operation against the file data stored on the disk 114, and then, in step 210, sends requested information or an acknowledgement to the client.

When the client receives a reply message from the server, in step 208 the client unlocks the directory or directories involved, and in step 209 passes on the return code to the application, thus completing the invocation of the directory operation.

If, in step 205, the client determines that the server has failed before sending a reply message, the client waits for indication that the server has been restarted or another node has taken over the server function, and then repeats the directory checking operation in step 202. If the directory checking operation 202 indicates that the directory operation would complete successfully it retries the operation.

If in step 202 the client determines that the operation would not complete, in step 204 the client determines whether the server (or an alternate server) has recovered. If the server has recovered, the client prepares to return a success indication to the application in step 207 and then releases its directory lock in step 208. Once the directory lock has been released the client returns a success code to the application.

If, in step 204, the client determines that the server (or an alternate server) has not recovered. In step 206 the client prepares to send an error indication to the application and then releases its directory lock in step 208. The preparation (also referred to in steps 207 and 210) refers to storing the appropriate completion code (error or success) in a memory location. Once the directory lock has been released the filesystem client software 112 returns the "error" completion code to the system services 118 which, in turn, passes the completion code to the application process 120.

Server failure detection can be accomplished in any number of conventional ways such as waiting for a timeout or monitoring the server for posting of a failure status message. The failure detection mechanism may run on any node of the cluster as long as all clients are informed of server node failures and subsequent restarts. In any event, it should be understood that in step 205, the client determines whether the server node itself has failed rather than the requested operation.

A requested operation is considered to have failed when it can not be performed by a fully operational server. For example, in a typical distributed system, a server can not create a file that already exists or delete a file that does not exist. The server node is considered to have failed when it is non-operational at least with respect to a requested operation due to a software or hardware problem. An example of a server failure would be the inability to read a directory entry due to a disk error.

The example of a file creation operation in a directory will now be considered with reference to FIG. 2. First, in step 201, a write (exclusive) lock is obtained on the directory. When the lock is granted, in step 204 the client determines whether the operation would succeed on a fully operational server by checking the directory to see if the file already exists. This directory checking operation can be carried out by sending a request message (as shown in FIG. 4a) to the server which then performs a directory check (as shown in FIG. 3a).

If the directory check determines that file in question already exists in the file system, in step 204 the client returns an error code to the application in step 209 after unlocking the directory (in step 208) since this operation would fail on the server anyway. If the file does not exist, in step 203 the client then sends a message to the server requesting that the file be created as described below. Note that there can be other reasons for a create operation to fail. For example, the user requesting the create may not have the authorization to do, in which case the steps 205 and 210 would be executed and an error code would be returned to the client in step 209.

Assuming that the examination of the directory at the client for the new file reveals that the file does not exist, in step 203 a message containing the name of the directory, the name of the new file to be created, and an indication that this is a file create operation are sent to the server. If the server operates properly, in step 210 it creates the file in the directory and responds with a code that indicates success of the requested operation.

Figure 3B:
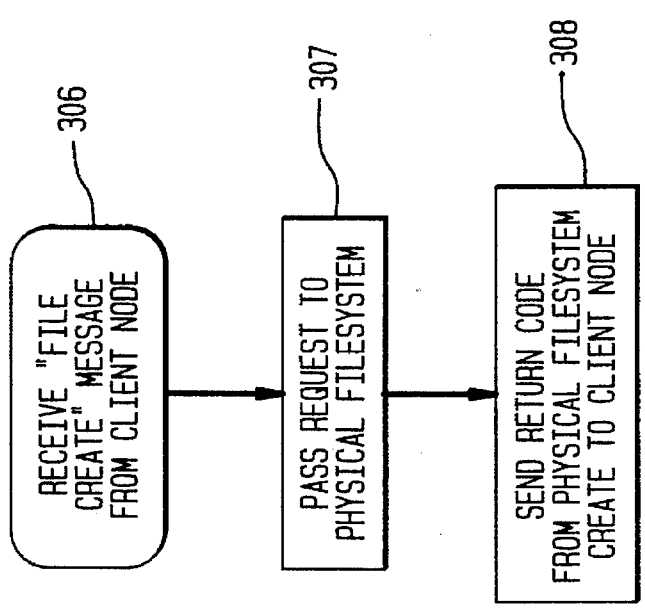
FIGS. 3a and 3b are flow chart of the distributed file system server task in the present system; and, FIGS. 4a–4d illustrate message formats in the present system.
Figure 3A:
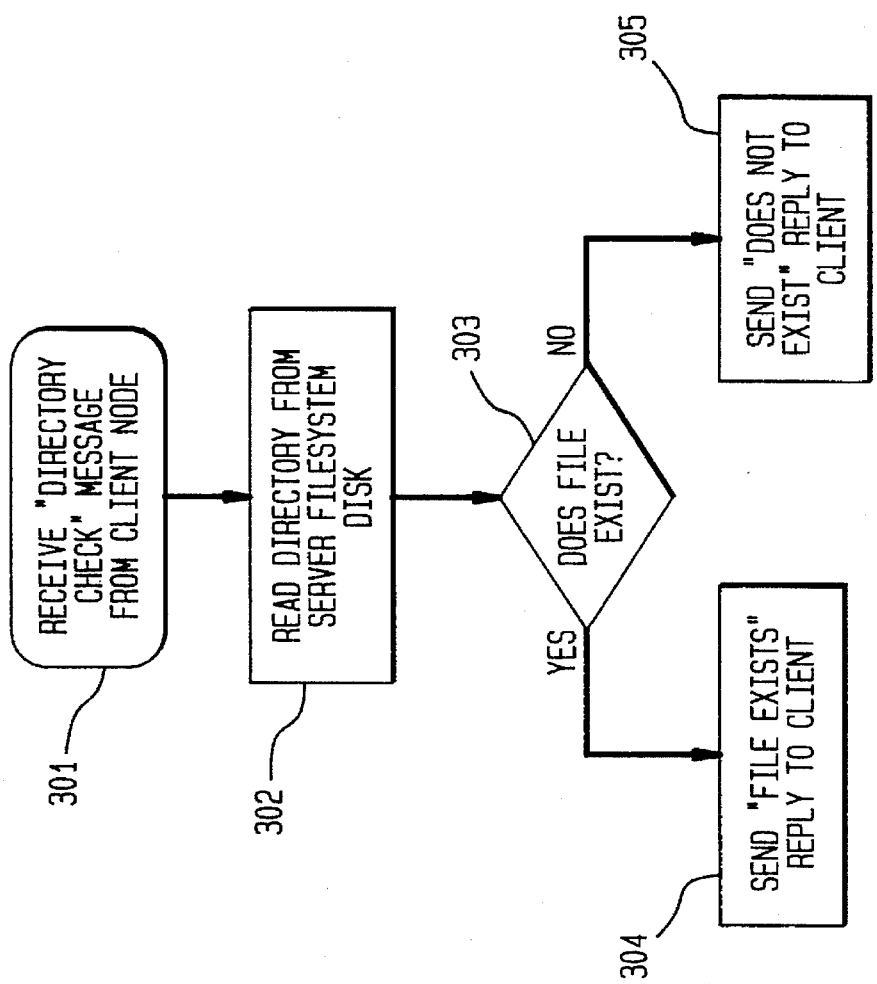

The operation of the server in performing a directory check is shown in FIG. 3a. After receipt of a "directory check" message from a client in step 301, in step 302 the server reads the contents of the directory 114a from the physical filesystem 114. Then in step 303 the server determines whether a file having the requested name already exists. If the file already exists, in step 304 the server sends a reply back to the client so indicating. If the file does not exist, the server sends a message to the client so indicating in step 305.

FIG. 3b shows the flow of control in the filesystem server software after it receives a "file create" message. In step 306, the message is received. Then, in step 307 the message fields (FIG. 4c) are extracted and passed to the physical filesystem software 107. The results of the physical filesystem operation are placed in a return message (of the type shown in FIG. 4d) and sent to the client in step 308.

The format of a directory check message is shown in FIG. 4a. The directory check message contains the following fields: the node identifier 401 of the requesting node (this field is used when the reply message is returned by the server); a message type field (in this case the type is "directory check"); a user identification field 403 which contains the identification of the user under whose authority this file is being created (this field is used to implement security); a filehandle field 404 which contains a filehandle that identifies the parent directory in which the file is to be created; and a file name field which contains the actual name of the file to be searched for, and subsequently created.

The format of the reply message is shown in FIG. 4b. The message fields are: a server ID field 406 for storing the identity of the server (on receipt of a response, a client will use this information to correlate the response to a request); the message type field 402 (in this case "Check reply"); and, a response code field 408 for storing a response code indicating if the file was found or not.

The format of a file create message to the server is shown in FIG. 4C. Fields 401–404 are the same as for the directory check message except that the "message type" field is set to "create". Instead of field 405, the file create message includes a file created field 413 which includes the name of the file to be created.

FIG. 4d shows the format of a "file create reply" message of the type sent from the filesystem server software 107. The fields include the unique identifier 414 of the server node, the message type 402 which is "create reply" in this case, the response code 408 from the physical filesystem 107 which indicates success or failure, a filehandle 417 identifying the newly created file and a set of attributes 418 describing the new file (i.e. owner, creation time, size, etc).

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for a client to request operations on a directory in a distributed file system, said method comprising the steps of:
   (a) obtaining a lock on the directory;
   (b) determining whether the directory operation will complete successfully absent a hardware failure of a server node;
   (c) if the directory operation will complete successfully, requesting that the server node perform the directory operation; and,
   (d) on completion of the directory operation, releasing the lock on the directory.

2. The method of claim 1 comprising the further steps of:
   (e) detecting a failure of the server node during performance of the directory operation;
   (f) when the failure of the server node is detected, determining whether the operation successfully completed;
   (g) when it is determined that the operation did not successfully complete, again requesting that the server node perform the directory operation.

3. The method of claim 2 wherein step (g) includes the steps of:
   again determining whether the operation would successfully complete if the operation were re-requested;
   when it is determined that the operation would successfully complete, re-requesting that the server node perform the operation; when it is determined that the operation would not successfully complete, informing the client node that the operation has not successfully completed and releasing the lock.

4. The method of claim 3 wherein the client node and the server node are computer systems on a common communication network.

5. The method of claim 2 wherein step (e) includes the further steps of:
   again determining whether the operation would successfully complete if the operation were re-requested;
   when it is determined that the operation would successfully complete, re-requesting that the server node perform the operation;
   when it is determined that the operation would not successfully complete, informing the client node that the operation has successfully completed and releasing the lock.

6. A method for a client node on a communication network to request operations on a directory maintained by a server node in a distributed file system, said method comprising the steps of:
   (a) obtaining a lock on the directory by the client node;
   (b) determining whether the directory operation on the distributed file system maintained by the server node will complete successfully absent a hardware failure of the server node;
   (c) when it is determined that the directory operation on the file system will complete successfully, requesting, by the client node, that the server node perform the directory operation;
   (e) when it is determined that the directory operation on the distributed file system will not complete, returning a failure code to the client node; and,
   (f) on completion of the directory operation on the distributed file system, releasing the lock on the directory by the server node.

7. The method of claim 6 comprising the further steps of:
   (g) detecting a failure of the server node during performance of the directory operation;
   (h) when the failure of the server node is detected, determining whether the operation successfully completed;
   (i) when it is determined that the operation did not successfully complete, again requesting that the server perform the directory operation.

8. The method of claim 6 wherein the client node and the server node are computer systems on a common communication network.

9. A system for use by a client node in requesting directory operations in a distributed file system having a server node, comprising:
   (a) means for obtaining a lock on the directory;
   (b) means, coupled to the distributed file system, for determining whether the directory operation will complete successfully absent a hardware failure of the server node;
   (c) means, coupled to the means for determining, for requesting that the server node perform the directory operation when it is determined that the directory operation will complete successfully; and, (d) means for releasing the lock on the directory on completion of the directory operation.

10. The system of claim 9 wherein the directory is maintained by the server node for the distributed file system.

11. The system of claim 9 further comprising:

means for detecting a failure of the server not during performance of the directory operation and for when the failure of the server node is detected, determining whether the directory operation successfully completed; and, means for when it is determined that the directory operation did not complete, again that the server redo the directory operation.

12. The method of claim 9 wherein the client node and the server node are computer systems on a common communication network.

13. A method for a client to request operations on a directory in a distributed file system of a type wherein the directory is maintained by a server, comprising the steps of:

obtaining a lock on the directory by the client;

predicting whether a directory operation invoked by a program executing on the client will successfully complete;

responsive to a prediction that the directory operation will successfully complete, requesting that the server perform the directory operation;

after requesting that the server perform the directory operation, determining whether the directory operation has successfully completed; and, responsive to a determination that the directory operation has been successfully completed, releasing the lock on the directory.

14. The method of claim 13 comprising the further steps of:

detecting a failure of the server during performance of the directory operation; and, responsive to detection of the failure, again requesting that the server perform the directory operation.

15. The method of claim 13 comprising the further step of:

responsive to a prediction that the directory operation will not successfully complete, returning a failure code to the program.

16. A system use by a client in requesting operations on a directory in a distributed file system of a type wherein the directory is maintained by a server, comprising:

means for obtaining a lock on the directory by the client;

means for predicting whether a directory operation invoked by a program executing on the client will successfully complete;

means responsive to a prediction that the directory operation will successfully complete, for requesting that the server perform the directory operation;

means for determining whether the directory operation has been successfully completed; and, means responsive to a determination that the directory operation has been successfully completed, for releasing the lock on the directory.

17. The system of claim 16, further comprising, means responsive to a prediction that the directory operation will not successfully complete, for returning a failure code to the program.

18. A computer program product instantiated in a computer readable memory that can be used to direct functions of a computer when used by a computer, comprising:

means for obtaining a lock, by a client, on a directory in a distributed file system;

means for predicting whether a directory operation invoked by the client will successfully complete;

means responsive to a prediction that the directory operation will successfully complete, for requesting that a server responsible for maintaining the directory perform the directory operation;

means for determining whether the directory operation has been successfully completed; and, means responsive to a determination that the directory operation has been successfully completed, for releasing the lock on the directory.

* * * * *